(12) United States Patent
Wang et al.

(10) Patent No.: US 11,874,169 B2
(45) Date of Patent: Jan. 16, 2024

(54) DEVICE FOR MEASURING TRANSMITTANCE CURVE OF FABRY-PEROT USING FREQUENCY COMB LIGHT SOURCE AND METHOD USING THE SAME

(71) Applicant: HEFEI INSTITUTE OF PHYSICAL SCIENCE, CHINESE ACADEMY OF SCIENCES, Anhui (CN)

(72) Inventors: Yingjian Wang, Anhui (CN); Yufei Chu, Anhui (CN); Dong Liu, Anhui (CN); Decheng Wu, Anhui (CN); Zhenzhu Wang, Anhui (CN); Kunming Xing, Anhui (CN); Zhiqiang Kuang, Anhui (CN); Bangxin Wang, Anhui (CN); Zhiqing Zhong, Anhui (CN); Aiyuan Fan, Anhui (CN); Chenbo Xie, Anhui (CN)

(73) Assignee: HEFEI INSTITUTE OF PHYSICAL SCIENCE, CHINESE ACADEMY OF SCIENCES, Anhui (CN)

( * ) Notice: Subject to any disclaimer, the term of this patent is extended or adjusted under 35 U.S.C. 154(b) by 588 days.

(21) Appl. No.: 17/042,197

(22) PCT Filed: Jan. 9, 2020

(86) PCT No.: PCT/CN2020/071165
§ 371 (c)(1),
(2) Date: Sep. 28, 2020

(87) PCT Pub. No.: WO2021/031521
PCT Pub. Date: Feb. 25, 2021

(65) Prior Publication Data
US 2023/0152153 A1    May 18, 2023

(30) Foreign Application Priority Data

Aug. 21, 2019 (CN) .......................... 201910771802.5

(51) Int. Cl.
*G01J 3/26* (2006.01)
*G01J 3/02* (2006.01)
*G01J 3/45* (2006.01)

(52) U.S. Cl.
CPC ............... *G01J 3/26* (2013.01); *G01J 3/0208* (2013.01); *G01J 3/0297* (2013.01); *G01J 3/45* (2013.01)

(58) Field of Classification Search
CPC .......... G01J 3/26; G01J 3/0208; G01J 3/0297; G01J 3/45; G01J 3/28; G01M 11/02
See application file for complete search history.

(56) References Cited

U.S. PATENT DOCUMENTS 5,970,076 A * 10/1999 Hamada ................ H01S 5/0687
372/98
6,992,763 B2   1/2006 Kishikawa et al.
(Continued)

FOREIGN PATENT DOCUMENTS

CN  102183234 A   9/2011
CN  102183486 A   9/2011
(Continued)

OTHER PUBLICATIONS

First Office Action in counterpart Chinese Application No. 201910771802.5, dated Apr. 14, 2020.
(Continued)

*Primary Examiner* — Kevin Quarterman
*Assistant Examiner* — Akbar Hassan Rizvi

(57) ABSTRACT

This application relates to a device for measuring a transmittance curve of an Fabry-Perot using a frequency comb light source and a method using the same. The device includes the following components sequentially arranged in an optical path: a single frequency pulse laser generating single frequency pulse laser; a frequency comb laser con-
(Continued)

verting received single frequency pulse laser into frequency comb laser; and an Fabry-Perot to be detected receiving laser output from the frequency comb laser; where the device further includes a first receiving unit receiving laser from an output end of the frequency comb laser and performing component and spectrum analysis, and a second receiving unit receiving laser from an output end of the Fabry-Perot to be detected and performing component and spectrum analysis.

9 Claims, 3 Drawing Sheets

(56) References Cited

U.S. PATENT DOCUMENTS

| | | | | |
|---|---|---|---|---|
| 2008/0266547 | A1* | 10/2008 | Clark | G01N 21/4738 |
| | | | | 356/73 |
| 2015/0086217 | A1* | 3/2015 | Galvanauskas | H01S 3/2383 |
| | | | | 398/188 |

FOREIGN PATENT DOCUMENTS

| | | | |
|---|---|---|---|
| CN | 102346140 | A | 2/2012 |
| CN | 102508231 | A | 6/2012 |
| CN | 103018012 | A | 4/2013 |
| CN | 103048121 | A | 4/2013 |
| CN | 103712689 | A | 4/2014 |
| CN | 103762496 | A | 4/2014 |
| CN | 107121193 | A | 9/2017 |
| CN | 109738162 | A | 5/2019 |
| CN | 110501141 | A | 11/2019 |
| JP | 2012028621 | A | 2/2012 |

OTHER PUBLICATIONS

The Second Office Action in counterpart Chinese Application No. 201910771802.5, dated Dec. 11, 2020.
International Search Report in corresponding PCT Application No. PCT/CN2020/071165, dated May 20, 2020.
Written Opinion of the International Searching Authority in corresponding PCT Application No. PCT/CN2020/071165, dated May 20, 2020.

* cited by examiner

DEVICE FOR MEASURING TRANSMITTANCE CURVE OF FABRY-PEROT USING FREQUENCY COMB LIGHT SOURCE AND METHOD USING THE SAME

FIELD

This application relates to the technical field of detection of transmittance of Fabry-Perot (FP), and in particular to a device and method for measuring a transmittance curve of an FP using a frequency comb light source.

BACKGROUND

Fabry-Perot (FP) etalon is a kind of interferometer, mainly composed of two flat glass or quartz plates. It can be used as a high-resolution filter or a precision wavelength meter for high-resolution spectral analysis. In the laser system, it is usually used to shrink the line in the cavity or make the laser system work in a single mode. It may be used as a medium bandwidth control and tuning device for broadband picosecond lasers. It may also be widely used as a frequency discriminator in Doppler wind measurement or aerosol detection of lidar. Due to the wide application of FP etalon, the standard transmittance curve of FP etalon is a very important parameter.

The standard transmittance curve of FP etalon is generally measured by adjusting the wavelength of the incident light source, or adjusting the cavity length of the FP or the angle of the incident light. However, laser sources with wavelength tuning function are very expensive, and it is difficult to find laser sources with a corresponding wide wavelength tuning range for some FP etalons with a wide free spectral range, and FP etalons with adjustable cavity length are also very expensive. Moreover, it is difficult to ensure that the change of the tuning of the wavelength or the angle of the incident light is linear, and each change of the step size will introduce a new error, which ultimately leads to insufficient measurement accuracy.

Specifically, an ordinary etalon consists of two parallel reflecting surfaces.

When plane beam $U_0$ is incident on the etalon, it will be continuously reflected and transmitted on the two reflecting surfaces. As shown in FIG. 1, incident angle of $U_0$ is $\theta$. Amplitudes of the transmitted beams are:

$$U_1' = U_0(1-R_1)(1-R_2);$$

$$U_2' = U_0(1-R_1)(1-R_2)R_1R_2 e^{i\delta};$$

$$U_3' = U_0(1-R_1)(1-R_2)R_1^2 R_2^2 e^{2i\delta};$$

$$U_4' = U_0(1-R_1)(1-R_2)R_1^3 R_2^3 e^{3i\delta};$$

...

where, $$\delta = \frac{4\pi n h \cos\theta}{\lambda} \quad (1)$$

total amplitude of transmitted beam is $$U' = U_0(1-R_1)(1-R_2)\left(1 + R_1 R_2 e^{i\delta} + R_1^2 R_2^2 e^{2i\delta} + R_1^3 R_2^3 e^{3i\delta} + \ldots\right)$$

$$= \frac{(1-R_1)(1-R_2)}{1 + R_1 R_2 e^{i\delta}} U_0$$

transmittance of etalon is $$T = \frac{U'U'^*}{U_0 U_0^*} = \frac{(1-R_1)(1-R_2)}{(1-R_1R_2)^2 + 4\sqrt{R_1 R_2}\sin^2\left(\frac{\delta}{2}\right)}$$

where $U'^*$ expresses conjugate function of $U'$, and $U^*_0$ expresses conjugate function of $U_0$, when amplitude reflectivity of the two surfaces of the etalon are equal, that is, $R_1=R_2$, and intensity reflectance of each surface is $R=R1^2$. Transmittance of etalon may be simplified to the following form, $$T = \frac{1}{1 + \frac{4R}{(1-R)^2}\sin^2\left(\frac{\delta}{2}\right)} \quad (2)$$

It can be seen from the above expression that the transmittance T of FP is related to cavity length, wavelength and angle of incident light. We can either directly obtain the transmittance curve of FP by changing the wavelength, or measure the transmittance curve by the equivalent wavelength change caused by changes in the incident angle and cavity length. However, no matter if the incident angle is changed, the cavity length is changed, or the wavelength of the laser source is changed, the change cannot be guaranteed to be linear and accurate, and multiple measurements of parameters with different parameter values will introduce random relative errors.

SUMMARY

In order to overcome the above-mentioned shortcomings in the prior art, this application provides a device for measuring a transmittance curve of an FP by using a frequency comb light source and method using the same.

In order to achieve the above objective, this application adopts the technical solution as follows.

A device for measuring a transmittance curve of an FP using a frequency comb light source, including the following components sequentially arranged in an optical path:
a single frequency pulse laser generating single frequency pulse light;
a frequency comb laser converting received single frequency pulse light into frequency comb light; and
an FP to be detected receiving light output from the frequency comb laser;
where the device further includes a first receiving unit receiving light from an output end of the frequency comb laser and performing component and spectrum analysis, and a second receiving unit receiving light from an output end of the FP to be detected and performing component and spectrum analysis.

Specifically, the device further includes a first beam splitter splitting the frequency comb laser into a first output of laser and a second output of laser, where the first output of laser is reflected to the first receiving unit and the second output of laser is transmitted to the FP to be detected.

Specifically, the first receiving unit includes a second beam splitter receiving laser output from the first beam splitter, and two laser beams split by the second beam splitter are respectively emitted into a first detector of the first receiving unit and a first spectrometer of the first receiving unit.

Specifically, the second receiving unit includes a third beam splitter, a second detector, and a second spectrometer, and two laser beams split by the third beam splitter are respectively emitted to the second detector and the second spectrometer.

Specifically, the device further includes a collimator provided with an optical aperture and arranged between the first beam splitter and the FP to be detected.

Specifically, the FP to be detected is an air gap etalon.

In addition, the FP to be detected may also be a solid etalon.

Specifically, the device further includes a computer, where a signal input end of the computer is connected to an output end of the first receiving unit and an output end of the second receiving unit, respectively, and a control end of the single frequency pulse laser is connected to a signal output end of the computer.

A method using the above device for measuring the transmittance curve of the FP by using the frequency comb light source, including the following operations:

S1, obtaining the required single frequency pulse laser and the frequency comb laser with a set type, and assembling the device;

S2, transforming, by the frequency comb laser, the single frequency pulse laser output from the single frequency pulse laser into lasers with different frequency components, passing, of the lasers with different frequency components, through the FP, and measuring, by the detector and the spectrometer, transmittances corresponding to the different frequency components at one time; and S3, performing, by the computer, polynomial fitting on transmittances corresponding to all frequency components to obtain the transmittance curve.

Specifically, specific operations of measuring transmittances corresponding to the different frequency components in operation S2 are:

S21, removing the FP in the device, obtaining energy in the first detector of the first receiving unit and the second detector of the second receiving unit, and obtaining an energy ratio N1=energy value of the first detector/energy value of the second detector, where N1 is configured as a calibration coefficient; and S22, after calibration, comparing a relative energy change of a frequency component measured by the first spectrometer of the first receiving unit and a frequency component measured by the second spectrometer of the second receiving unit, and multiplying the relative energy change by the calibration coefficient to obtain a transmittance of a corresponding frequency.

The advantage of this application is that since the frequency comb light source has multiple frequency components with equal frequency intervals, there is no nonlinearity, so it may measure the transmittance curve of the FP etalon at one time. And the frequency interval and spectral range are adjustable. This method greatly reduces the cost of measuring the transmittance curve, improves the measurement accuracy and effectiveness, and has good theoretical and practical value.

Figure 1:
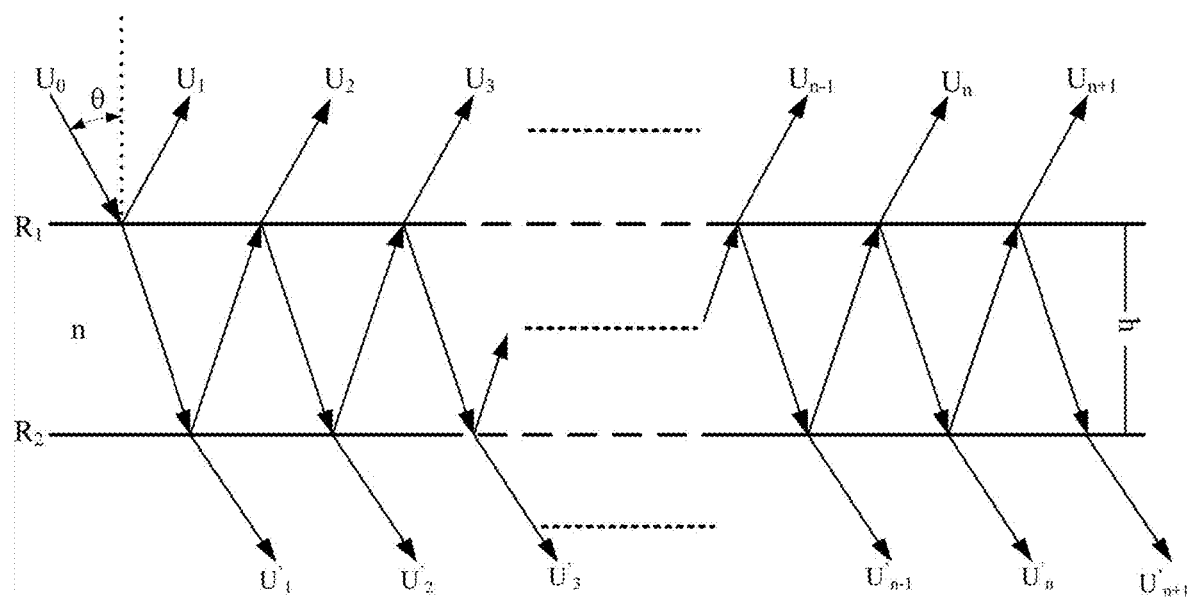
FIG. 1 is a schematic diagram for calculating a transmittance of a common etalon in background art.

The meanings of the reference numerals in the figures are as follows:

1-single frequency pulse laser, 2-frequency comb laser, 3-FP 41-first beam splitter, 42-second beam splitter, 43-third beam splitter, 5-collimator 61-first detector, 62-first spectrometer, 71-second detector, 72-second spectrometer

DETAILED DESCRIPTION OF THE EMBODIMENTS

Embodiment 1

Figure 3:
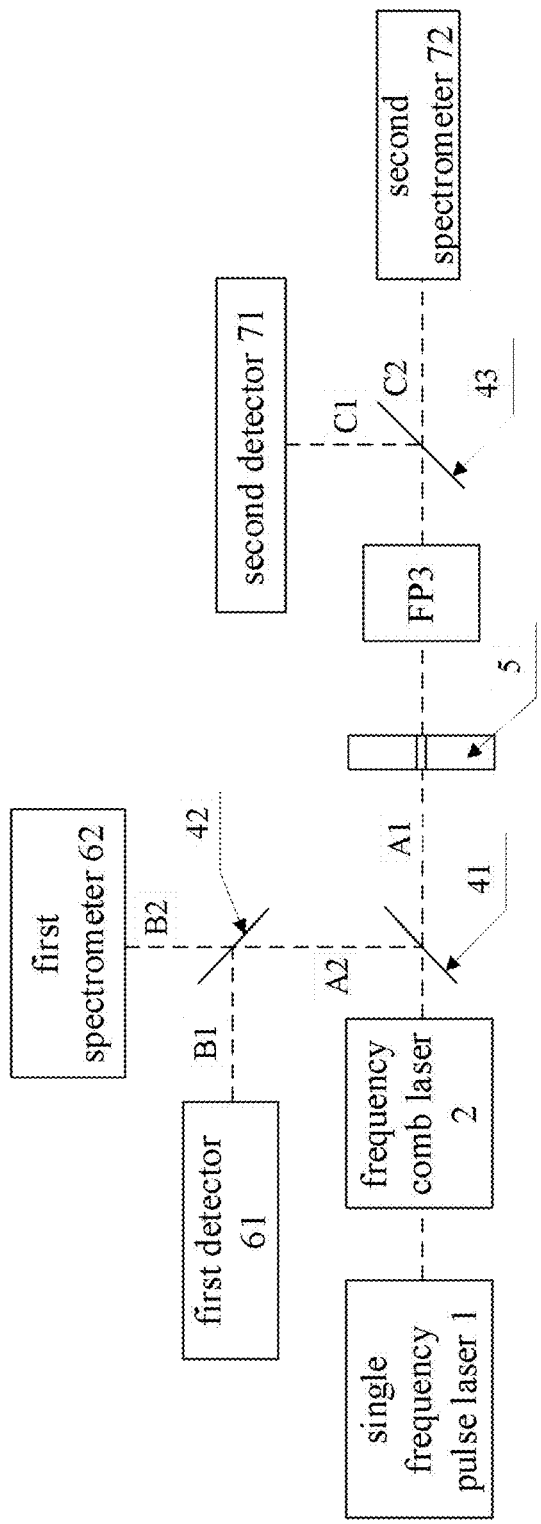
FIG. 3 is a schematic structural diagram of this application.

As shown in FIG. 3, a device for measuring a transmittance curve of an FP using a frequency comb light source, including the following components sequentially arranged in an optical path:

a single frequency pulse laser 1 generating single frequency pulse light;

a frequency comb laser 2 converting received single frequency pulse light into frequency comb light; and an FP 3 to be detected receiving light output from the frequency comb laser;

the device further includes a first beam splitter 41, a first receiving unit, and a second receiving unit. The first receiving unit is configured to receive light from an output end of the frequency comb laser 2 and perform component and spectrum analysis. The second receiving unit is configured to receive light from an output end of the FP 3 to be detected and perform component and spectrum analysis. The first beam splitter 41 splits the frequency comb light into a first output of light and a second output of light. The first output of light is reflected to the first receiving unit and the second output of laser is transmitted to the FP 3 to be detected. The first receiving unit includes a second beam splitter 42, a first detector 61, and a first spectrometer 62. The second beam splitter 42 splits the light emitted into the first receiving unit into two beams and transmits them to the first detector respectively 61 and the first spectrometer 62, respectively. The second receiving unit includes a third beam splitter 43, a second detector 71, and a second spectrometer 72. The third beam splitter 43 splits the light emitted into the second receiving unit into two beams and transmits them to the second detector 71 and the second spectrometer 72, respectively.

The single frequency pulse laser 1 outputs multiple frequency components at equal intervals through the frequency comb laser 2, and the multiple frequency components pass through the first beam splitter 41 to be split into a beam A1 and a beam A2. The second beam splitter 42 splits the beam A2 into a beam B1 and a beam B2, and then detects a frequency component of the beam B2 by the first spectrometer 62, and the first detector 61 receives energy of the beam B1. The beam A1 passes through the FP 3 etalon, and the beam is split into a beam C1 and a beam C2 by the third beam splitter 43, and then a frequency component of the beam C2 is detected by the second spectrometer 72, and the beam C1 is received by the second detector 71 to measure its energy. The energy changes of the first detector 61 and the second detector 71 are used for calibration, and then by comparing the relative energy changes of the corresponding frequency components before and after the FP 3, the transmittance of the corresponding frequency may be obtained. The transmission curve may be obtained by fitting each frequency component by a polynomial.

The device further includes a collimator 5 provided with an optical aperture and arranged between the first beam splitter 41 and the FP 3 to be detected, so as to adjust the light beam transmitted to the FP 3 to be detected.

Specifically, the FP 3 to be detected is an air gap etalon or a solid etalon.

The device further includes a computer (not shown), where a signal input end of the computer is connected to an output end of the first receiving unit and an output end of the second receiving unit and a control end of the single frequency pulse laser 1 is connected to a signal output end of the computer. The computer controls and processes the data.

Embodiment 2

Figure 2:
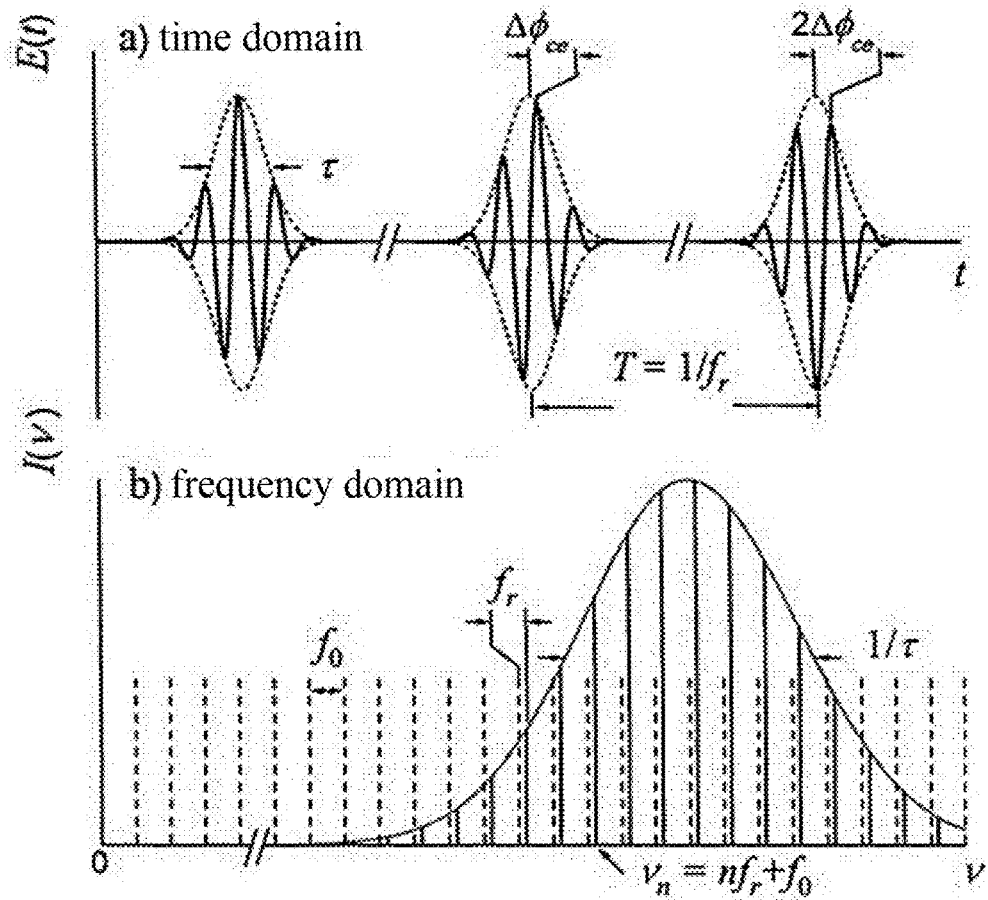
FIG. 2 is a diagram of working principle of a frequency comb laser, where FIG. a shows a time domain diagram and FIG. b shows a frequency domain diagram.

A method using the above device for measuring the transmittance curve of the FP by using the frequency comb light source as described in Embodiment 1, including the following operations:

S1, obtaining the required single frequency pulse laser 1 and the frequency comb laser 2 with a set type, and assembling the device;

S2. according to the working principle of the frequency comb laser 2 in FIG. 2, transforming, by the frequency comb laser 2, the single frequency pulse laser output from the single frequency pulse laser into lasers with different frequency components, passing, of the lasers with different frequency components, through the FP 3, and measuring, by the detector and the spectrometer, transmittances corresponding to the different frequency components at one time; and Specific operations of measuring transmittances corresponding to the different frequency components are:

S21, removing the FP 3 in the device, obtaining energy in the first detector 61 of the first receiving unit and the second detector 71 of the second receiving unit, and obtaining an energy ratio N1=energy value of the first detector 61/energy value of the second detector 71, where N1 is configured as a calibration coefficient; and S22, after calibration, comparing a relative energy change of a frequency component measured by the first spectrometer 62 of the first receiving unit and a frequency component measured by the second spectrometer 72 of the second receiving unit, and multiplying the relative energy change by the calibration coefficient to obtain a transmittance of a corresponding frequency.

S3, performing, by the computer, polynomial fitting on transmittances corresponding to all frequency components to obtain the transmittance curve.

In this embodiment, taking a solid etalon as an example, the main parameters are shown in the following table.

| Technical parameter | Requirement | Technical parameter | Requirement |
|---|---|---|---|
| Center wavelength (nm) | 532 | Surface accuracy @633 nm | λ/100 |
| Material refractive index | 1.461 | Fine number | 17.9 |
| Beam divergence full angle (mrad) | 8 | Peak transmittance | 0.860 |
| Thickness of etalon (mm) | 0.1311 | FWHM(pm) | 41.3 |
| Optical aperture (mm) | 40 | Center wavelength (nm) | 532.12 |
| Effective aperture (mm) | 30 | Resource spectral range (pm) | 739 |
| Reflectivity | 86% | | |

Combining the parameters in the table with the calculation methods in the background technology, the numerical simulation results of the etalon transmittance curve may be obtained.

It can be seen from the above numerical simulation results that when the thickness of the etalon is 131 μm and the two optical surfaces are coated with 86% reflective film, the center wavelength of the etalon is 532.37 nm and the peak transmittance is 86%.

Figure 4:
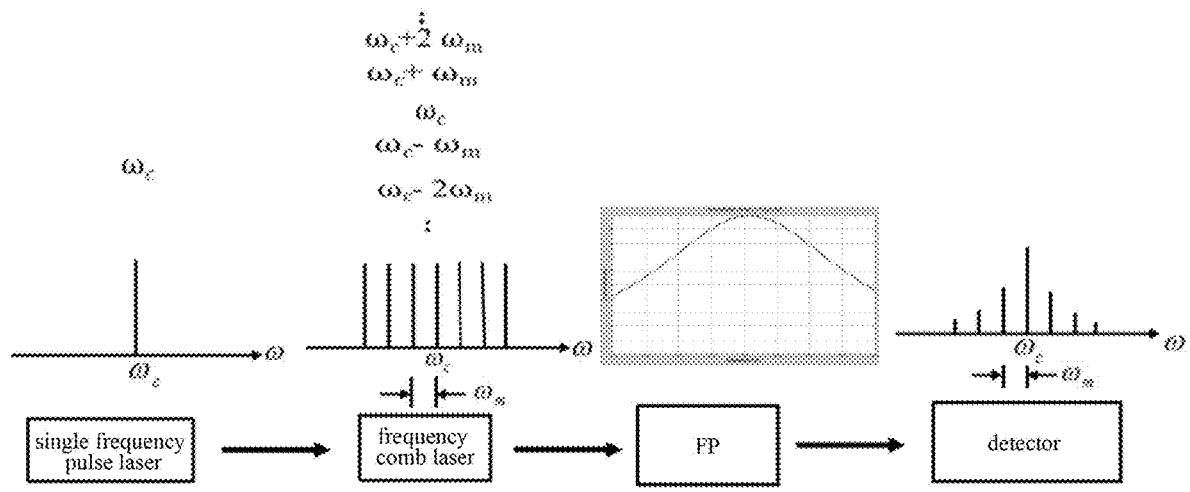
FIG. 4 is a schematic diagram of obtaining the transmittance using this application.
Figure 5:
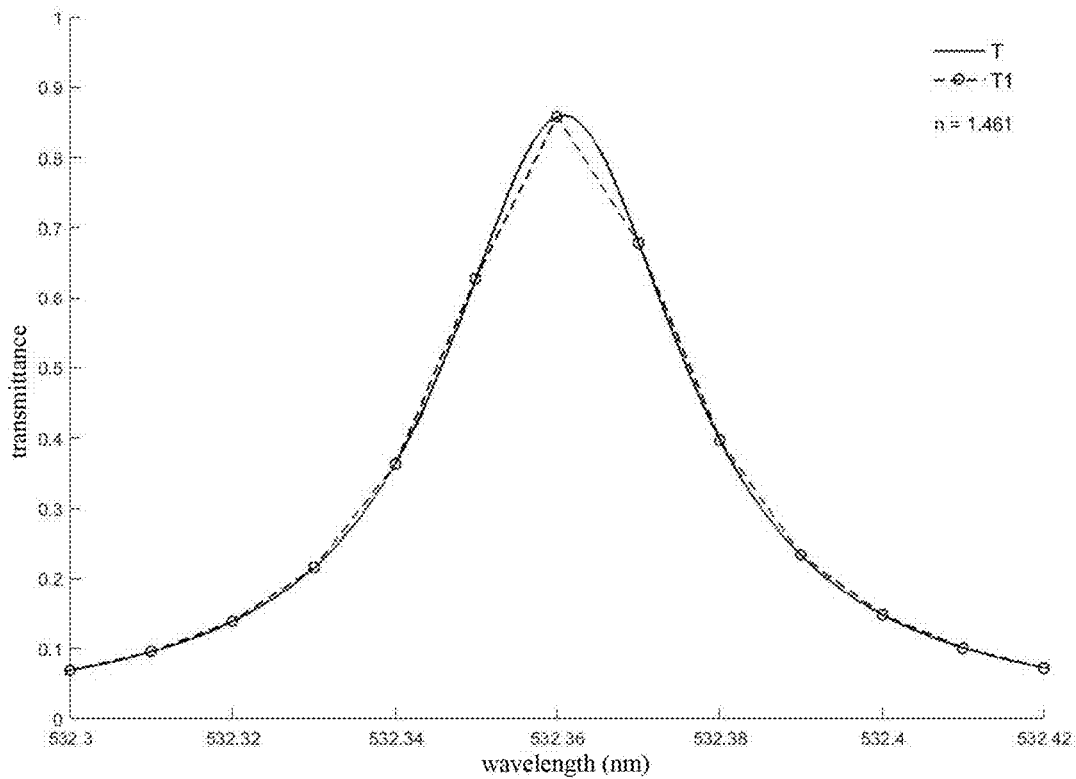
FIG. 5 shows a transmittance curve T obtained by theoretical calculation and a transmittance curve T1 obtained by using the device and method of this application.

According to this solution, that is, according to the principle shown in FIG. 4, according to the different frequency components in FIG. 4, when different frequency components pass the FP 3 etalon, the transmittance will change with the change of frequency, and the overall change trend will be consistent with the actual transmittance curve of FP 3, so the transmittances corresponding to different frequency components may be measured at one time by this method, and then polynomial fitting performed on the transmittances corresponding to all frequency components to get the transmittance curve needed, as shown in FIG. 5.

In FIG. 5, T represents the theoretical transmittance curve, and T1 represents the transmittance curve obtained by the method described herein. As can be seen from the figure, the two agree very well. This method of obtaining the FP 3 transmittance curve through one measurement greatly improves the measurement accuracy and effectiveness, and has great theoretical and application value.

The above are only preferred embodiments of this application and are not intended to limit this application. Any modification, equivalent replacement and improvement made within the spirit and principle of this application should be included in the scope of protection of this application.

What is claimed is:

1. A device for measuring a transmittance curve of a Fabry-Perot using a frequency comb light source, comprising the following components sequentially arranged in an optical path:
   a single frequency pulse laser generating single frequency pulse laser;
   a frequency comb laser converting received single frequency pulse laser into frequency comb laser; and
   a Fabry-Perot to be detected receiving laser output from the frequency comb laser;
   wherein the device further comprises a first receiving unit receiving laser from an output end of the frequency comb laser and performing component and spectrum analysis, a second receiving unit receiving laser from an output end of the Fabry-Perot to be detected and performing component and spectrum analysis, and a collimator provided with an optical aperture and arranged between the first beam splitter and the Fabry-Perot to be detected.

2. The device for measuring the transmittance curve of the Fabry-Perot by using the frequency comb light source according to claim 1, further comprising a first beam splitter splitting the frequency comb laser into a first output of laser and a second output of laser, wherein the first output of laser is emitted into the first receiving unit and the second output of laser is emitted into the Fabry-Perot to be detected.

3. The device for measuring the transmittance curve of the Fabry-Perot by using the frequency comb light source according to claim 2, wherein the first receiving unit comprises a second beam splitter receiving laser output from the first beam splitter, and two laser beams split by the second beam splitter are respectively emitted into a first detector of the first receiving unit and a first spectrometer of the first receiving unit.

4. The device for measuring the transmittance curve of the Fabry-Perot by using the frequency comb light source according to claim 3, wherein the second receiving unit comprises a third beam splitter, a second detector, and a second spectrometer, and two laser beams split by the third beam splitter are respectively emitted to the second detector and the second spectrometer.

5. The device for measuring the transmittance curve of the Fabry-Perot by using the frequency comb light source according to claim 1, wherein the Fabry-Perot to be detected is an air gap etalon.

6. The device for measuring the transmittance curve of the Fabry-Perot by using the frequency comb light source according to claim 1, wherein the Fabry-Perot to be detected is a solid etalon.

7. The device for measuring the transmittance curve of the Fabry-Perot by using the frequency comb light source according to claim 6, further comprising a computer, wherein a signal input end of the computer is connected to an output end of the first receiving unit and an output end of the second receiving unit, respectively, and a control end of the single frequency pulse laser is connected to a signal output end of the computer.

8. A method using a device for measuring a transmittance curve of a Fabry-Perot by using a frequency comb light source, the device comprising the following components sequentially arranged in an optical path:
a single frequency pulse laser generating single frequency pulse laser;
a frequency comb laser converting received single frequency pulse laser into frequency comb laser; and
a Fabry-Perot to be detected receiving laser output from the frequency comb laser;
wherein the device further comprises a first receiving unit receiving laser from an output end of the frequency comb laser and performing component and spectrum analysis, a second receiving unit receiving laser from an output end of the Fabry-Perot to be detected and performing component and spectrum analysis, and a collimator provided with an optical aperture and arranged between the first beam splitter and the Fabry-Perot to be detected;
wherein the method comprises the following operations:
obtaining the required single frequency pulse laser and the frequency comb laser with a set type, and assembling the device;
transforming, by the frequency comb laser, the single frequency pulse laser output from the single frequency pulse laser into lasers with different frequency components, passing, by the lasers with different frequency components, through the Fabry-Perot, and measuring, by the detector and the spectrometer, transmittances corresponding to the different frequency components at one time; and
performing, by the computer, polynomial fitting on transmittances corresponding to all frequency components to obtain the transmittance curve.

9. The method according to claim 8, wherein specific operations of measuring transmittances corresponding to the different frequency components are:
removing the Fabry-Perot in the device, obtaining energy in the first detector of the first receiving unit and the second detector of the second receiving unit, and obtaining an energy ratio N1=energy value of the first detector/energy value of the second detector, wherein N1 is configured as a calibration coefficient; and
after calibration, comparing a relative energy change of a frequency component measured by the first spectrometer of the first receiving unit and a frequency component measured by the second spectrometer of the second receiving unit, and multiplying the relative energy change by the calibration coefficient to obtain a transmittance of a corresponding frequency.

* * * * *